(12) United States Patent
Lord et al.

(10) Patent No.: US 11,657,353 B2
(45) Date of Patent: *May 23, 2023

(54) SYSTEM AND METHOD FOR DATA DRIVEN RISK RELATIONSHIP REVIEW TOOL

(71) Applicant: HARTFORD FIRE INSURANCE COMPANY, Hartford, CT (US)

(72) Inventors: Erik R. Lord, Sorrento, FL (US); Todd K Minarik, Saint Charles, IL (US); Ed I Closner, Simpsonville, SC (US); Jason Patrick Corrigan, Liverpool, NY (US); Milia M. Shipman, Phoenix, AZ (US); Robert L. Hughes, Folsom, CA (US); Kari Yvonne DeMont, Westminster, MD (US); Brett David Perrie Boliou, Roseville, CA (US); Sara San, El Dorado Hills, CA (US); Willis D Schmidt, Jr., Southington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,016

(22) Filed: Aug. 31, 2022

(65) Prior Publication Data

US 2022/0414561 A1    Dec. 29, 2022

Related U.S. Application Data

(63) Continuation of application No. 16/837,413, filed on Apr. 1, 2020, now Pat. No. 11,481,708.

(51) Int. Cl.
*G06Q 10/06*    (2023.01)
*G06Q 10/10*    (2023.01)
(Continued)

(52) U.S. Cl.
CPC ........ *G06Q 10/0635* (2013.01); *G06N 20/20* (2019.01); *G06Q 10/06375* (2013.01)

(58) Field of Classification Search
CPC .............................. G06Q 10/06; G06Q 10/10
(Continued)

(56) References Cited

U.S. PATENT DOCUMENTS

| 7,664,664 | B2* | 2/2010 | King | G06Q 10/0635 |
| | | | | 705/7.36 |
| 11,481,708 | B2* | 10/2022 | Lord | G06N 20/20 |

(Continued)

*Primary Examiner* — Nga B Nguyen
(74) *Attorney, Agent, or Firm* — Buckley, Maschoff & Talwalkar LLC

(57) ABSTRACT

A system to provide an automated data driven risk relationship review tool via a back-end application computer server of an enterprise. A resource allocation data store may contain electronic records representing requested resource allocations between the enterprise and a plurality of entities. The server may receive an indication of a selected requested resource allocation and retrieve, from the resource allocation data store, the electronic record associated with the selected requested resource allocation. The server may automatically calculate a first and second review date for the selected requested resource allocation and automatically establish, between at least two parties, a communication link based on the calculation of the first review date for the selected requested resource allocation. The system may then support a graphical interactive user interface display via a distributed communication network, the interactive user interface display providing resource allocation data in connection with the second review date.

21 Claims, 20 Drawing Sheets

(51) Int. Cl.
*G06Q 10/0635* (2023.01)
*G06N 20/20* (2019.01)
*G06Q 10/0637* (2023.01)

(58) Field of Classification Search
USPC ........................................................ 705/7.28
See application file for complete search history.

(56) References Cited

U.S. PATENT DOCUMENTS

2012/0215574 A1* 8/2012 Driessnack ........ G06Q 10/0639
705/7.12
2015/0254597 A1* 9/2015 Jahagirdar ..... G06Q 10/063118
705/7.15

* cited by examiner

Claim Status Report – Workers' Compensation

The reserves will be revisited for an increase to see to the conclusion of the claim once we have the Commissioner's report.

$111,692.00 - Medical Incurred
$104,746.33 - Paid to Date
$6,945.96 - Outstanding $23,542.76 - Indemnity Incurred
$21,579.15 - Paid to Date
$1,963.61 - Outstanding $20,357.72 - Expense Incurred
$20,357.72 - Paid to Date
$0 - Outstanding

RESOLUTION PLAN:
As plaintiff counsel and I were resolving the permanency to the wrist and shoulder we received a form 42 with 43% permanency to the neck. Based on this new information I had the claimant examined by Dr. _____ on 3/10/19. Dr. _____ does not causally relate the neck to our date of loss. I filed a form 43 denial which Plaintiff Counsel has appealed. We now await the date of a Commissioner's exam on the neck issue. Once we receive the results we will revisit our plans to resolve this claim with a full and final settlement.

This report is being provided for risk management purposes only, and is not to be used for employment or other unrelated purposes.

FIG. 1B   *PRIOR ART*

FIG. 2A     PRIOR ART

Claim Status Report – Workers' Compensation

RESERVE RATIONALE:

$35436.00 – Medical Incurred
    $30798.18 – Paid to Date
        $4638.78 – Ongoing medical treatment $118783.60 – Indemnity Incurred
    $73783.60 – Paid to Date
        $45,000 – Settlement contribution $15558.00 – Expense Incurred
    $12558.00 – Paid to Date
        $500 – Medical bill charges
        $2500 – Defense attorney fees

RESOLUTION PLAN:
The PPD award has been paid in full and the employee continues to seek medical treatment. Counsel has reached out to see if there is interest in settlement. There is a hearing set for 12/11 where this will be discussed. If there is no settlement interest, I recommend the claim be transferred to the medical maintenance unit to monitor ongoing treatment.

*This report is being provided for risk management purposes only, and is not to be used for employment or other unrelated purposes.*

SYSTEM AND METHOD FOR DATA DRIVEN
RISK RELATIONSHIP REVIEW TOOL

CROSS REFERENCE TO RELATED APPLICATION

This is a continuation of U.S. patent application Ser. No. 16/837,413, entitled "SYSTEM AND METHOD FOR DATA DRIVEN RISK RELATIONSHIP REVIEW TOOL," filed Apr. 1, 2020, the entire contents of which are incorporated herein by reference for all purposes.

BACKGROUND

It may be advantageous to analyze the risks and resource allocations associated with multiple systems and/or entities. For example, it might be advantageous to understand particular amounts of risk and allocations and the impact that such risks and allocations may have had on past (and, potentially, future) performance. Moreover, an enterprise might want to facilitate understanding and reaction to requests for allocations of resources—and a manual review of such requests may be an important part of this process.

In some cases, a report may be manually created and given to an insurance agent/broker and/or customer to help them understand the risk situation. For example, FIGS. 1A and 1B show an example of a typical report that may be used to review claim information with an insurance agent/broker or customer. In particular, FIG. 1A shows a first page 110 of typical claim status report that might be used to explain and/or review a workers' compensation claim. The report might be generated, for example, using a spreadsheet application such as the EXCEL® spreadsheet application available from MICROSOFT®. The first page 110 might include, for example, insured information 112 (e.g., of a business that purchased workers' compensation insurance from an insurer). The first page 110 might further include claim information 114, such as an employee name, claim number, date of hire, date of loss, occupation, location of loss, employment status, wage data, demographic information, attorney information, etc. The first page 110 might also include financial information 116, such as paid, outstanding, and/incurred monetary values for indemnity, medial, and expense costs. The first page 110 could also include claim professional information 118 (e.g., a name and contact information) and additional data (e.g., text notes describing the loss, providing a current medical status, a disability status, and mitigating factors). FIG. 1B shows a second page 120 of typical claim status report that might be used to explain and/or review a workers' compensation claim, including a reserve rationale 122 and a resolution plan 124.

Similarly, FIGS. 2A and 2B show another example of a typical report that may be used to review claim information with an insurance agent/broker or customer. As before, FIG. 2A shows a first page 210 of typical claim status report that might be used to explain and/or review a workers' compensation claim. The first page 210 again includes insured information 212, claim information 214, financial information 216, claim professional information 218, and additional data. FIG. 2B shows a second page 220 of typical claim status report that might be used to explain and/or review a workers' compensation claim, including a reserve rationale 222 and a resolution plan 224.

The breadth and depth of information associated with resource requests, often over an extended period of time, can overwhelm such a review process. That is, manually collecting, formatting, examining, and understanding these types of risks and allocations associated with risk relationships can be a complicated, time consuming, and error-prone task, especially when there are a substantial number of inter-related systems, entities, characteristics impacting resource allocations, and/or other factors involved in the analysis. Moreover, manually determining who should receive the report (and how and when they need to receive them) can be a difficult task for a claim handler, claim account executive, workforce manager, team leader, etc.

It would be desirable to provide systems and methods to display an automated data driven risk relationship review tool in a way that provides more accurate results, which are easier to communicate in a timely fashion as compared to traditional approaches.

SUMMARY OF THE INVENTION

According to some embodiments, systems, methods, apparatus, and computer program code display an automated data driven risk relationship review tool in a way that provides more accurate results, which are easier to communicate in a timely fashion as compared to traditional approaches and that allow for flexibility and effectiveness when providing those results. In some embodiments, a system may provide an automated data driven risk relationship review tool via a back-end application computer server of an enterprise. The system may include a resource allocation data store that contains electronic records representing requested resource allocations between the enterprise and a plurality of entities. The server may receive an indication of a selected requested resource allocation and retrieve, from the resource allocation data store, the electronic record associated with the selected requested resource allocation. The server may automatically calculate a first and second review date for the selected requested resource allocation and automatically establish a communication link based on the first review date for the selected requested resource allocation. The system may then support a graphical interactive user interface display via a distributed communication network, the interactive user interface display providing resource allocation data in connection with the second review date.

Some embodiments comprise: means for receiving, by a computer processor of a back-end application computer server from a resource allocation data store, an indication of a selected requested resource allocation between an enterprise and an entity, wherein the resource allocation data store contains electronic records that represent a plurality of requested resource allocations between the enterprise and a plurality of entities, and further wherein each electronic record includes an electronic record identifier and a set of resource allocation values associated with risk attributes; means for retrieving, from the resource allocation data store, the electronic record associated with the selected requested resource allocation, including the set of resource allocation values associated with risk attributes; means for automatically calculating a first and second review date for the selected requested resource allocation; and means for automatically establishing a communication link based on the first review date for the selected requested resource allocation, wherein the back-end application computer server supports a graphical interactive user interface display via a distributed communication network, the interactive user interface display providing resource allocation data in connection with the second review date.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to display an automated data driven risk relationship review tool in a way that provides more accurate results, which are easier to communicate in a timely fashion as compared to traditional approaches. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 1A and 1B show an example of a typical report that is used to review claim information with an insurance agent/broker or customer.

FIGS. 2A and 2B show another example of a typical report that is used to review claim information with an insurance agent/broker or customer.

FIGS. 7A and 7B show an example of a claim review display in accordance with some embodiments.

FIGS. 8A and 8B show another example of a claim review display in accordance with some embodiments.

FIG. 9 illustrates an interactive claim review display according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic risk analysis and/or resource allocation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve the analysis of risk, the allocation of resources, and the automated exchange of information in a timely fashion, thus improving the overall efficiency of the system associated with message storage requirements and/or bandwidth considerations (e.g., by reducing the number of messages that need to be transmitted via a network). Moreover, embodiments associated with collecting accurate information might further improve risk values, predictions of risk values, allocations of resources, electronic record routing, etc.

Figure 3:
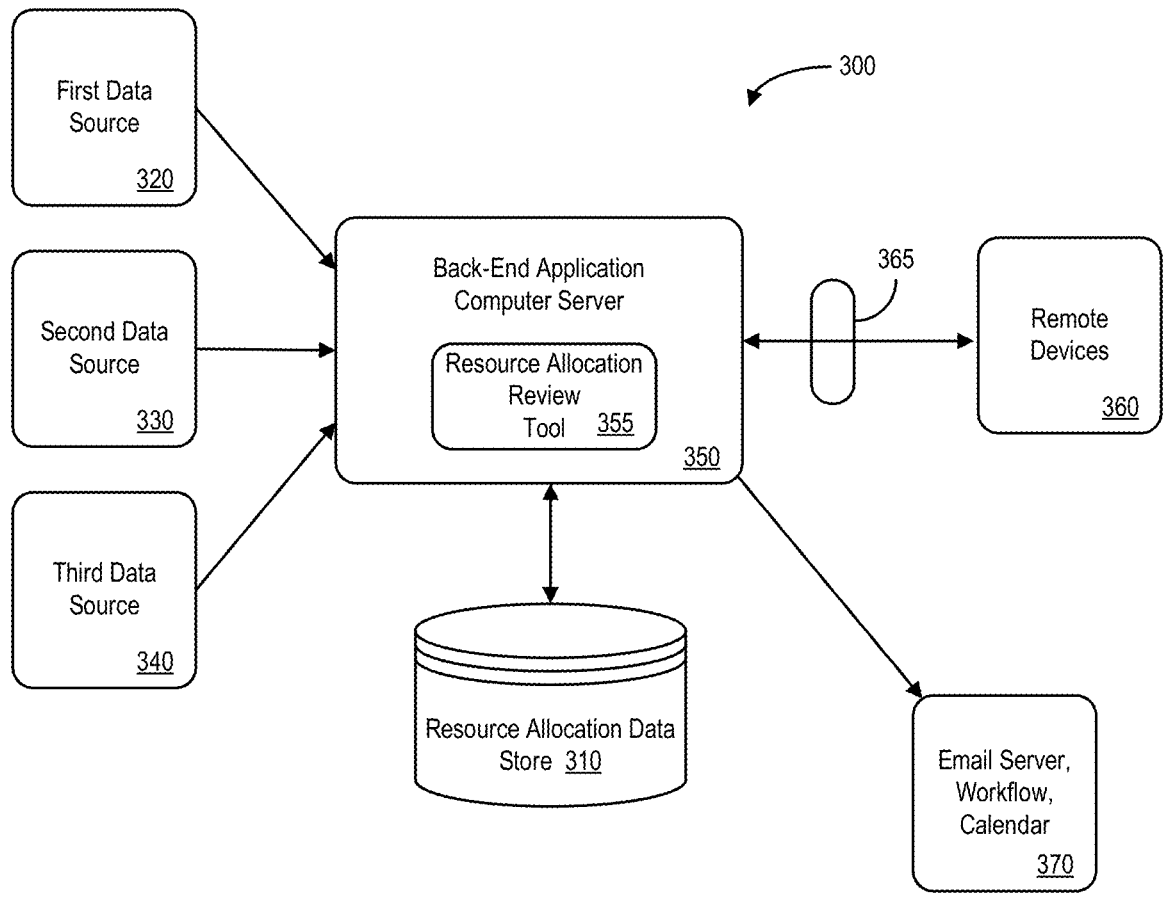
FIG. 3 is a high-level block diagram of a system architecture in accordance with some embodiments.

FIG. 3 is a high-level block diagram of a system 300 according to some embodiments of the present invention. In particular, the system 300 includes a back-end application computer 350 server that may access information in a resource allocation data store 310 (e.g., storing a set of electronic records representing requests for an allocation of resources, each record including, for example, one or more requested resource allocation identifiers, attribute variables, resource values, communication addresses, etc.). The back-end application computer server 350 may also retrieve information from other data stores or sources 320, 330, 340 in connection with a resource allocation review tool 355 and, in some embodiments, apply machine learning or artificial intelligence algorithms and/or models to the electronic records. The back-end application computer server 350 may also exchange information with a remote device 360 (e.g., via communication port 365 that might include a firewall).

According to some embodiments, an interactive graphical user interface platform of the back-end application computer server 350 (and, in some cases, third-party data) may facilitate the display of information associated with the resource allocation review tool 355 via one or more remote computers (e.g., to enable a manual review of a resource allocation request) and/or the remote device 360. For example, the remote device 360 may receive updated information (e.g., a new event timeline) from the back-end application computer server 350. Based on the updated information, a user may review the data from the resource allocation data store 310 and take informed actions in response to requests. For example, a communication link may be automatically established (e.g., based on a communication address in the resource allocation data store 310) in connection with an email server, workflow, and/or calendar application 370. The communication link might comprise, for example, an audio link, a text chat link, a video link, etc.

Note that the back-end application computer server 350 and/or any of the other devices and methods described herein might be associated with a cloud-based environment and/or a third party, such as a vendor that performs a service for an enterprise.

The back-end application computer server 350 and/or the other elements of the system 300 might be, for example, associated with a Personal Computer ("PC"), laptop computer, smartphone, an enterprise server, a server farm, and/or a database or similar storage devices. According to some embodiments, an "automated" back-end application computer server 350 (and/or other elements of the system 300) may facilitate updates of electronic records in the resource allocation data store 310. As used herein, the term "automated" may refer to, for example, actions that can be performed with little (or no) intervention by a human.

As used herein, devices, including those associated with the back-end application computer server 350 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 350 may store information into and/or retrieve information from the resource allocation data store 310. The resource allocation data store 310 might, for example, store electronic records representing a plurality of resource allocation requests, each electronic record having a set of attribute values including one or more resource values. The resource allocation data store 310 may also contain information about prior and current interactions with entities, including those associated with the remote devices 360. The resource allocation data store 310 may be locally stored or reside remote from the back-end application computer server 350. As will be described further below, the resource allocation data store 310 may be used by the back-end application computer server 350 in connection with an interactive user interface to provide information about the resource allocation review tool 355. Although a single back-end application computer server 350 is shown in FIG. 3, any number of such devices may be included. Moreover, various devices described herein might be combined according to embodiments of the present invention. For example, in some embodiments, the back-end application computer server 350 and the resource allocation data store 310 might be co-located and/or may comprise a single apparatus.

According to some embodiments, the system 300 may provide a graphical view of insurance claim files. This might help, for example, an insurance agent, broker, or customer quickly determine key claim information about an injured worker, insured, and/or treatment provider along with a risk score that might indicate when an insurance claim is veering "off track" (and might present a risk of a severe outcome for an enterprise).

Figure 4:
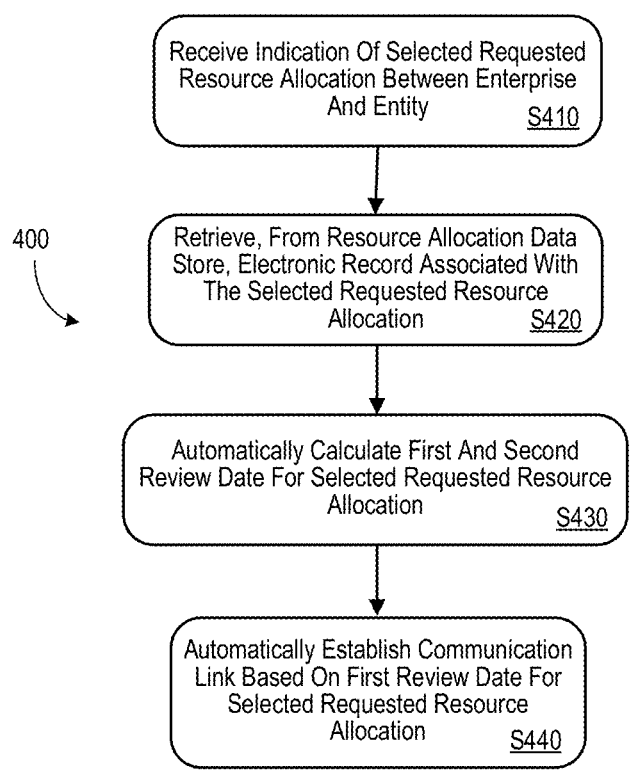
FIG. 4 illustrates a method according to some embodiments of the present invention.

Note that the system 300 of FIG. 3 is provided only as an example, and embodiments may be associated with additional elements or components. According to some embodiments, the elements of the system 300 automatically transmit information associated with an interactive user interface display over a distributed communication network. FIG. 4 illustrates a method 400 that might be performed by some or all of the elements of the system 300 described with respect to FIG. 3, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a back-end application computer server (e.g., associated with an enterprise) may receive an indication of a requested resource allocation between the enterprise and an entity. For example, an operator or administrator associated with the enterprise might select a resource allocation request from a list of pending resource allocation requests.

According to some embodiments, the operator may search for requests based on an entity name, a request type, a date associated with the request, etc. At S420, the back-end application computer server may retrieve, from a resource allocation data store, an electronic record associated with the selected requested resource allocation, including the set of resource allocation values associated with risk attributes.

At S430, the system may automatically calculate a first and second review date for the selected requested resource allocation. The first review date might, for example, indicate when a team internal to an insurance enterprise will review an insurance claim. The second review date might, according to some embodiments, indicate when the insurance enterprise will use claim review displays to explain an insurance claim situation to an insurance agent, broker, and/or customer.

At S440, the system may automatically establish a communication link based on the first review date for the selected requested resource allocation. This link might be used, for example, to internally (within an insurer) review and/or discuss claim information with a claim handler, claim account executive, workforce manager, team leader, etc. Note that the back-end application computer server may support a graphical interactive user interface display via a distributed communication network, and the interactive user interface display may provide resource allocation data (external to the insurer) in connection with the second review date. According to some embodiments, the calculation of the first and/or second review dates may be associated with a predictive model created using data fields and text flags identified in electronic records of the resource allocation data store, claim data, bill data from a bill review system, etc. Moreover, the user interface may further provide a view of claim factors that draw attention to the request if there is a potential of increasing severity.

In this way, embodiments may leverage insights from multiple machine learning assets and claim metrics to give a holistic view of the claim in one place. Moreover, risks of certain aspects of a claim may be calculated by the system which can then provide a "next best action" to a claim handler. In addition, the data visualization of claim activity and risk factors may enable quick orientation to the claim and provides a direction where a claim handler's attention should be focused (and, in some embodiments, a next best action). Further note that embodiments may provide information to help claim handlers determine an appropriate response (without automatically making any claim decisions).

Figure 5A:
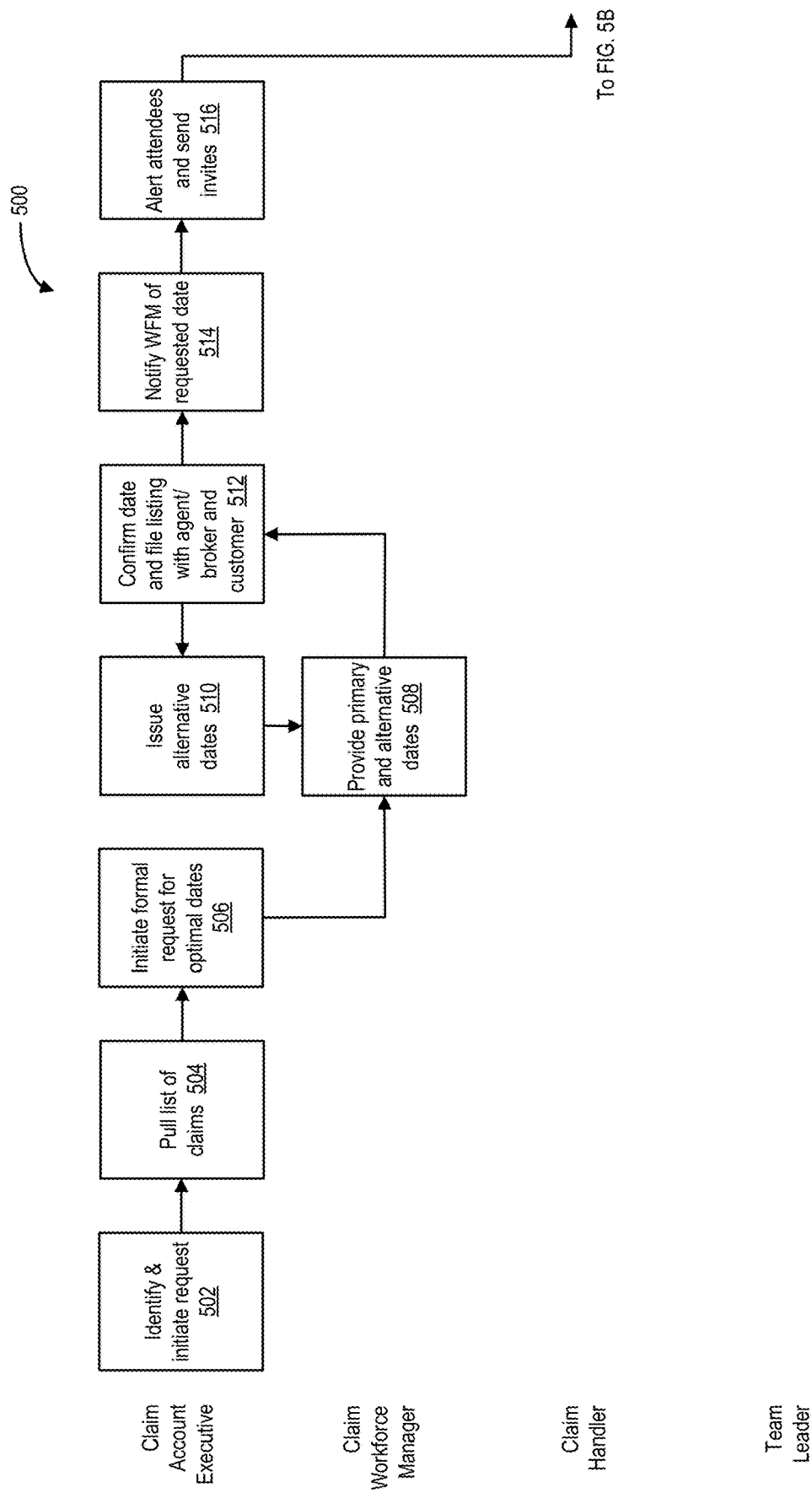
FIGS. 5A through 5C show a claim review process in accordance with some embodiments.
Figure 5B:
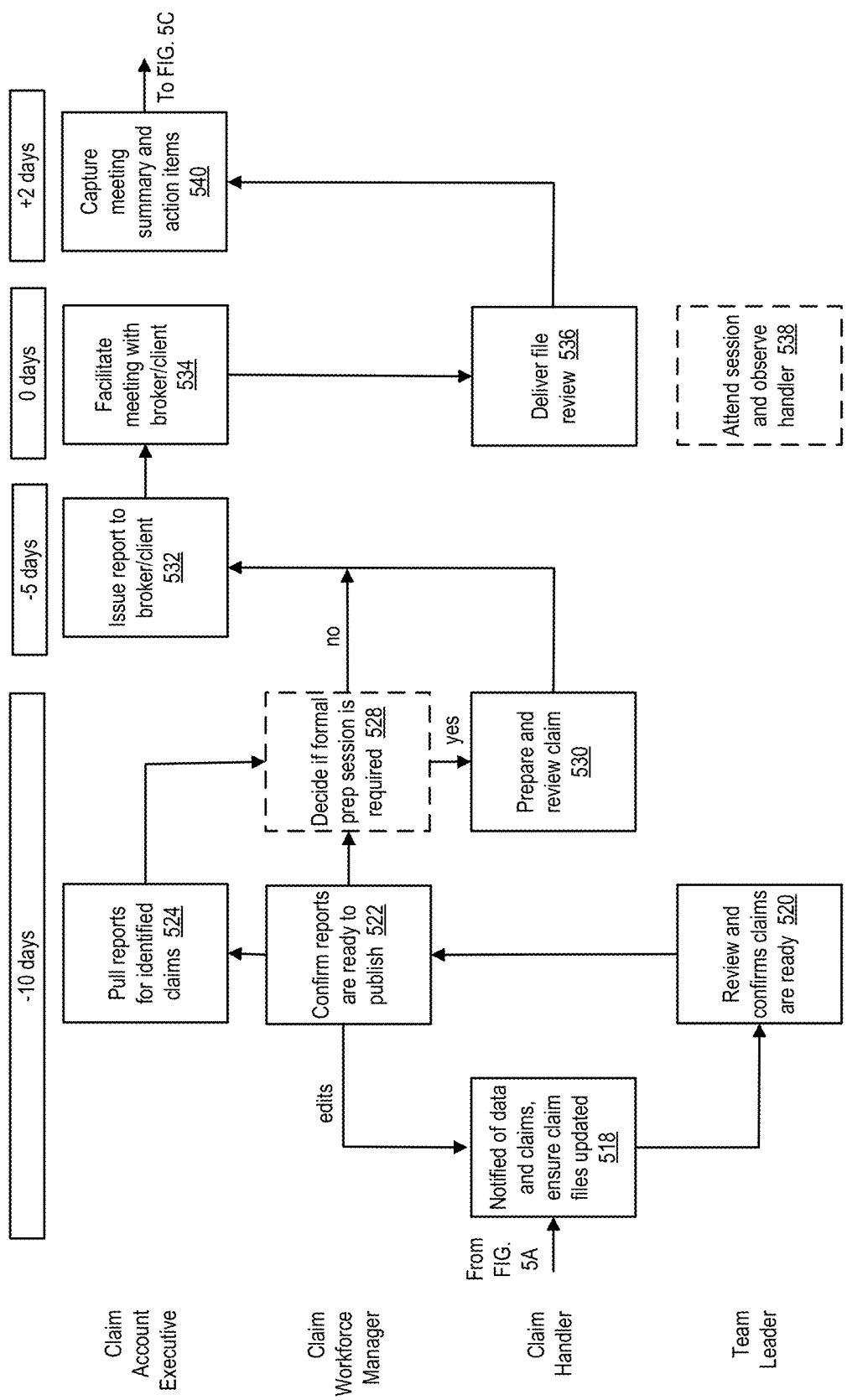
Figure 5C:
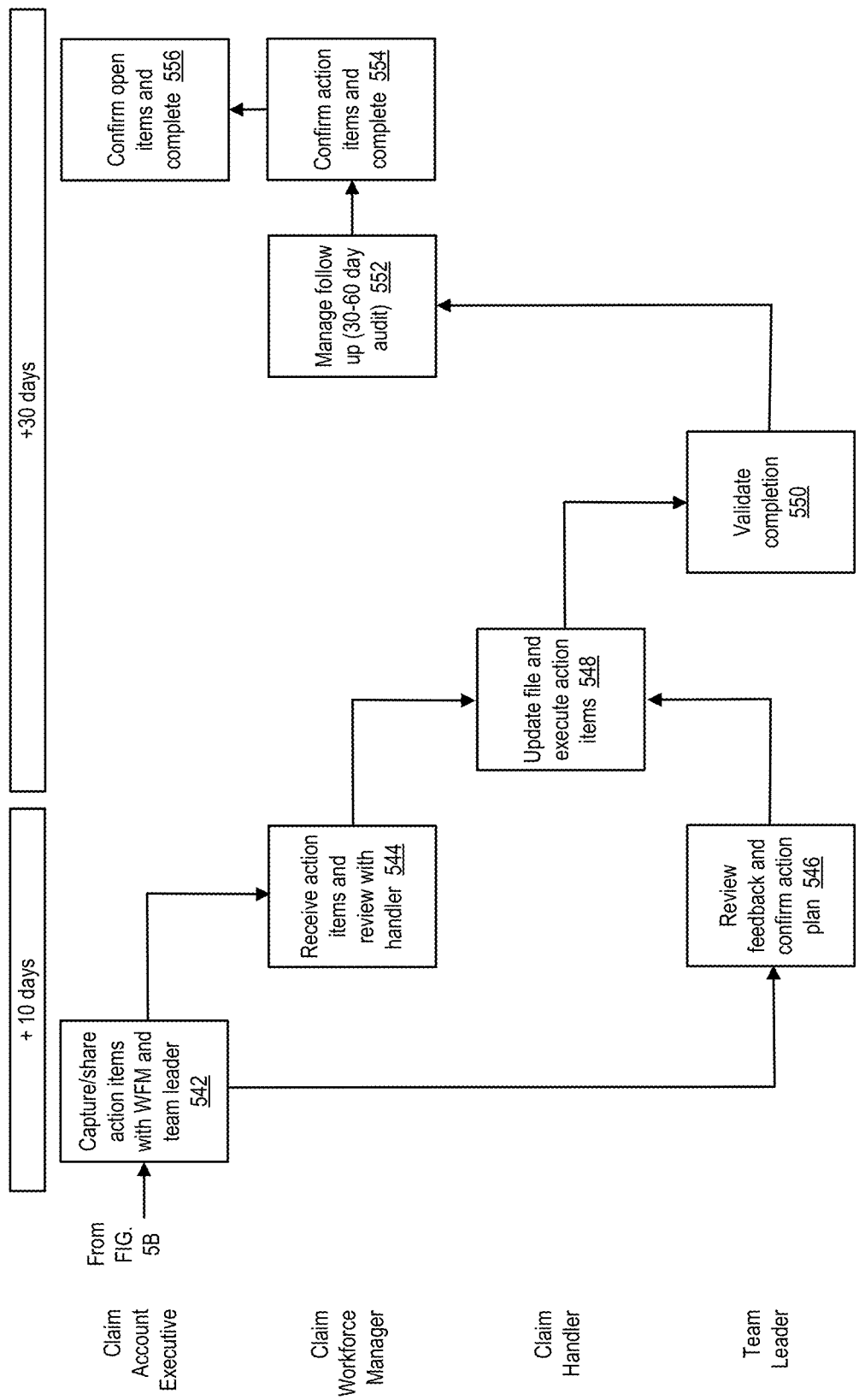

FIGS. 5A through 5C show a claim review process 500 that may be performed by a claim account executive, claim workforce manager ("WFM"), claim handler, and/or team leader in accordance with some embodiments. The process 500 might be performed, for example, quarterly, bi-annually, etc. At S02, the claim account executive may identify an agreed upon need for a claim file review and initiate a request that such a review be conducted. At S04, the claim account executive may pull a list of claims and initiate a formal request to the workforce manager for optimal review dates at 506.

At S08, the workforce manager may assess and provide primary and alternative dates to the claims account executive. At S10, the claim account executive may issue alternative dates and/or confirm dates and file listing with an insurance agent, broker, and/or customer at 512. This process may continue until the case account executive notifies the workforce manager of a requested date at 514 and alerts attendees by sending a calendar and/or meeting invitation at 516.

At 518, the claim handler is notified of the date and claim and will ensure that the claim files are updated and complete (e.g., 10 days before a claim review meeting). Similarly, at 520 the team leader may review and confirm that the claims are ready for review. At S22, the workforce manager may confirm that the reports are ready to publish and/or provides any required edits to the claim handler. This process may be repeated until the workforce manager indicates that the report is ready, causing the claims account manager to pull the reports for all identified insurance claims at 524. At S28, the workforce manager may optionally (as illustrated by the dashed line in FIG. 5B) decide if a formal preparation session is required. If so, at 530 the claim handler will review the claim. If not (or after the claim handler reviews the claim), at 532 the claim account executive may issue the report to the insurance broker, agent, and/or client (e.g., 5 days before a claim review meeting).

At S34, the claim account executive may facilitate the claim review meeting with the insurance broker, agent, and/or client and the claim handler may deliver the file review at 536 in accordance with any of the embodiments described herein (e.g., as described with respect to FIGS. 7A through 8B). Optionally, the team leader might attend the session to observe the claim handler at 538. The claim account executive may then capture the meeting summary and any action items arising from the review session at 540 (e.g., 2 days after the claim review meeting).

At S42, the claim account executive may share action items with the workforce manager and/or feedback with the team leader as appropriate (e.g., 10 days after the claim review meeting). The workforce manager may review. At S44, the workforce manager may review the action items and the team leader may review the feedback and confirm the action plan at 546. At S48, the claim handler may update the file and execute the action items (e.g., 30 days after the claim review meeting). At S50, the team leader may validate completion and the workforce manager may manage any required follow-up at 552. At S54, the workforce manager may confirm that all action items have been completed and the claim account executive may confirm that all open items are complete at 556.

Figure 6:
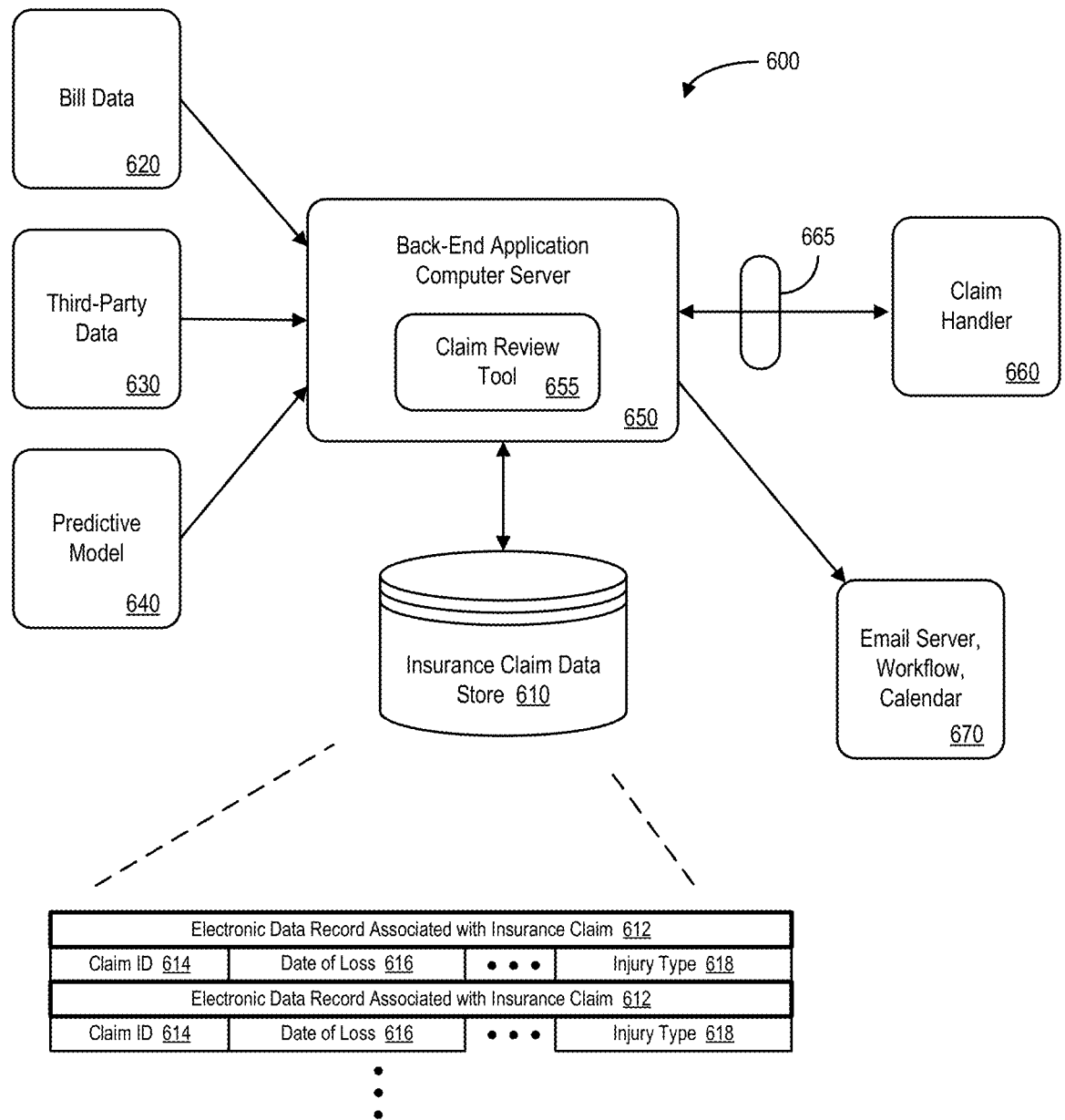
FIG. 6 is a more detailed block diagram of a system architecture according to some embodiments.

FIG. 6 is a more detailed high-level block diagram of a system 600 in accordance with some embodiments. As before, the system 600 includes a back-end application computer 650 server that may access information in a historic claim data store 610 (storing electronic data records associated with insurance claims 612, including a claim identifier 614, a date of loss 616, an injury type 618, a communication address, etc.) and transmit displays to a claim handler device 660 (e.g., vie a firewall 665). In this example, a claim review tool 655 may receive information from one or more bill data systems 620, third-party data systems 630, a predictive model 640, etc. The predictive model 640 might, according to some embodiments, use data fields and text flags identified in files automatically calculate review dates. The claim analysis tool 655 might also access insurance claim data to draw information that is available to the claim handler in their claim system (and, in some cases, data that is not visible to the claim handlers in the claim system). According to some embodiments, the claim analysis tool might use bill data 620 from a bill review system (e.g., associated with medical treatments from health care providers). The third-party data 630 might originate from medical providers or police reports. The back-end application computer server 650 might also transmit information directly to an email server, workflow application, calendar application 670 to facilitate insurance claim processing (e.g., to automatically schedule meetings, establish communication links, etc.).

Figure 1A:
Figure 7A:
Figure 7B:
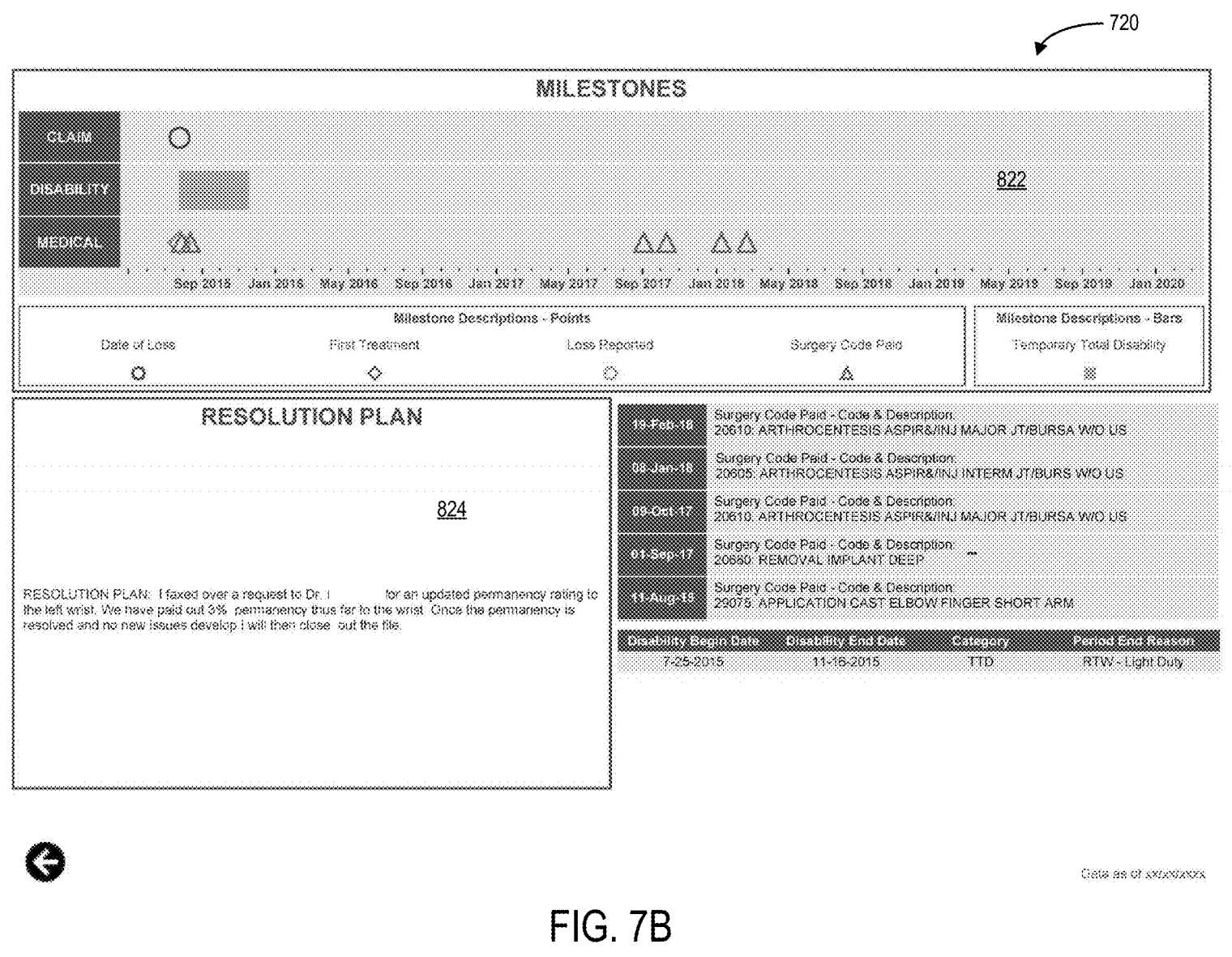

FIGS. 7A and 7B show an example of a claim review display in accordance with some embodiments. In particular, this display is associated with the example of FIGS. 1A and 1B. FIG. 7A shows a first page 710 of the display according to some embodiments including high level icons (e.g., loss year, attorney representation, etc.), a graphical representation of the claimant's body 712 highlighting injuries, demographic information 714, claim reserve data 716, a claim reserve rationale description 718, etc. In some embodiments, the page 710 might provide a claim detail data header in the demographic information 714 (e.g., including a date of loss, a compensability status, an open time status, a claimant age, and a claimant gender) and/or an insured detail data header (e.g., including an insured name, a claim program, and a re-assignment count). The body diagrams 712 (e.g., front and back views) may provide a graphical representation of injuries including a visual indication of claim or injury status (e.g., associated with claim status, injury description, diagnosis and recover information). According to some embodiments, selection of an injury (e.g., via touchscreen or a computer mouse points) might result in a pop-up window providing additional information (e.g., an indication that the injury is under investigation, is being treated, etc.). In some embodiments, the page 710, along with the other displays described herein, give a claim handler a high-level, holistic view that aggregates data from various disparate sources in connection with a single workers' compensation insurance claim. Such a view may help the insurer explain the claim to an insurance agent, broker, and/or customer in a more efficient and accurate manner.

According to some embodiments, the page 710 further includes resource allocation bar graphs in the reserves area 716 (e.g., associated with various costs including a total cost) and/or information about the last payment to the claimant (e.g., associated with a payment type, a status, a payment date, and a link to further payment details). The page 710 may further include an overall score (e.g., associated with how likely the claim is to dramatically change) and with prior claim information (e.g., associated with other claims by the same claimant). A set of dial displays (e.g., associated with various claim factors) might indicate to a claim handler whether various entities are relatively low-risk, relatively high-risk, etc. Such a claim (or "resource request") health index information might provide the claim handler with a view of the claim factors that draw his or her attention to the claim. The dial displays may be related to various actors associated with the claim. If there is a potential of the claim increasing in severity (or it is identified that the insured is not happy with the progress of the claim), the claim handler may be alerted to that fact via the appropriate dial display.

According to some embodiments, the page 710 might further include map-based geographic information and/or event timeline information associated with a claim. For example, the page 710 might include a "back" icon (left arrow) and "forward" icon (right arrow), and selection of the forward icon might result in the display of a second page 720 as illustrated in FIG. 7B. The second page 720 might include timeline information 822 showing major event throughout the history of the claim (e.g., date of loss, surgery, date of return to work, payments, treatments, etc.) and/or a resolution plan 824.

Figure 8A:
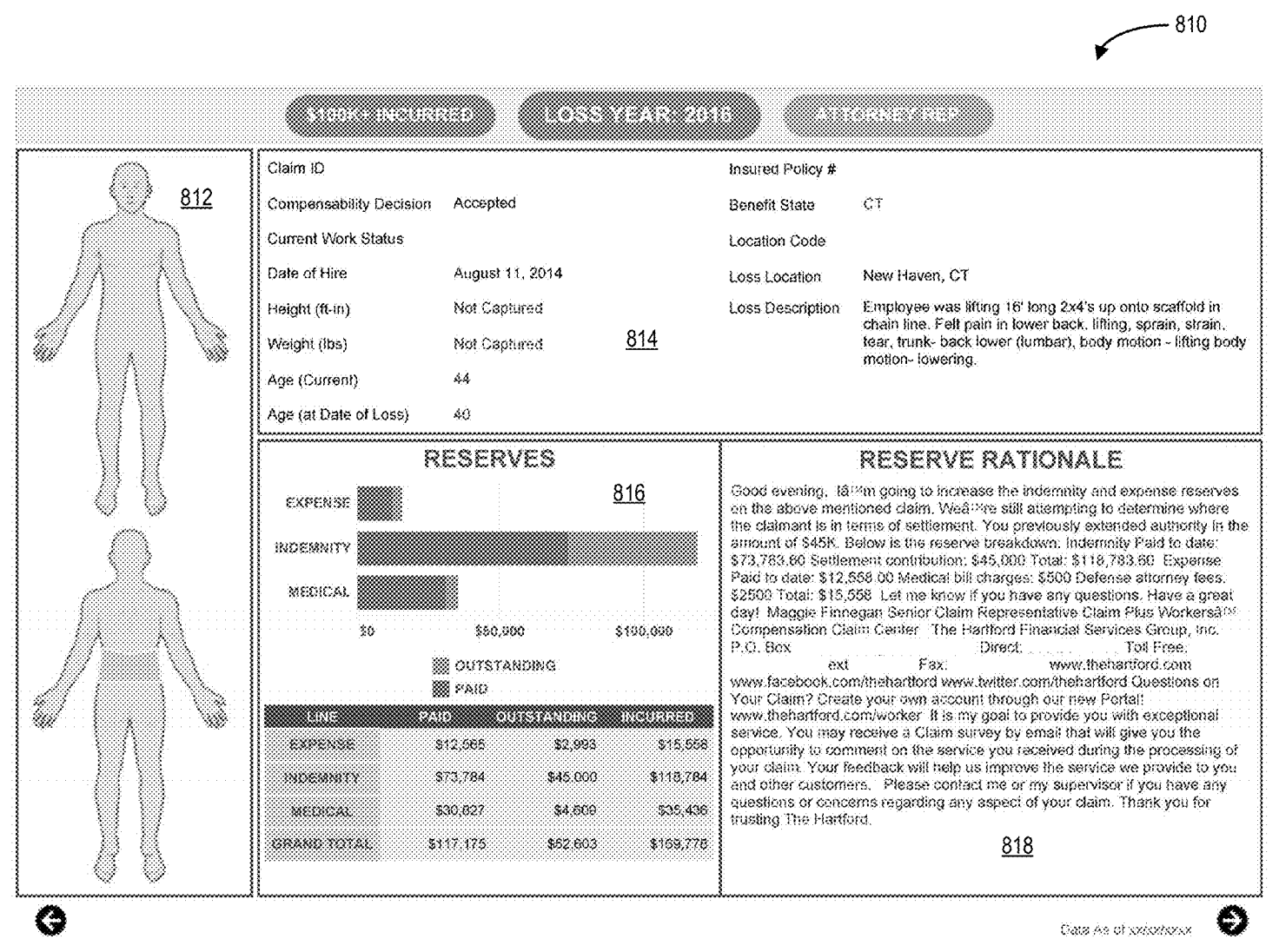
Figure 8B:
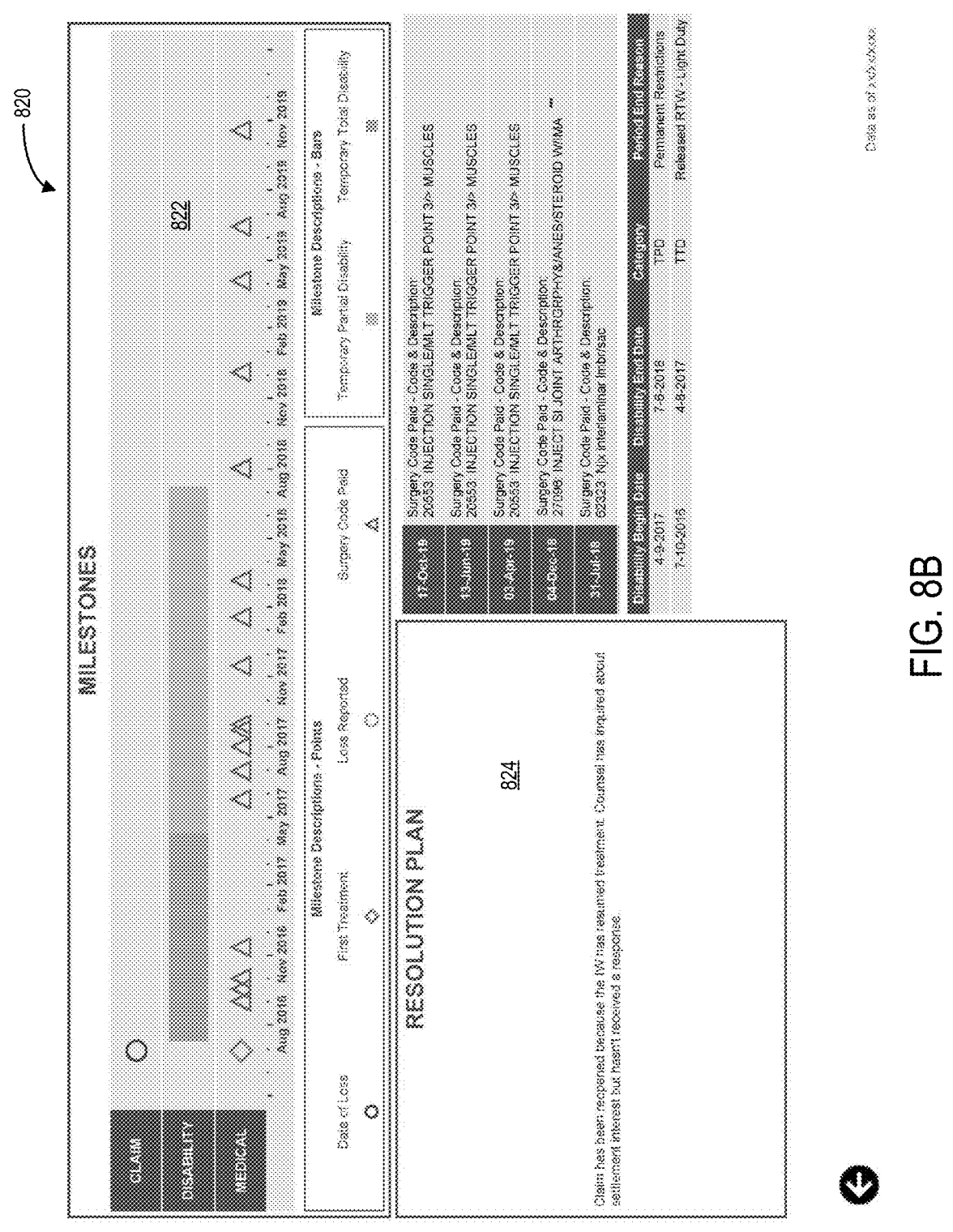

FIGS. 8A and 8B show another example of a claim review display in accordance with some embodiments. In this case, the display is associated with the example of FIGS. 2A and 2B. As before, a first page 810 of the display includes high level icons, a graphical representation of the claimant's body 812 highlighting injuries, demographic information 814, claim reserve data 816, a claim reserve rationale description 818, etc. FIG. 8B shows a second page 820 of the display, including timeline information 822 and/or a resolution plan 824.

Figure 9:
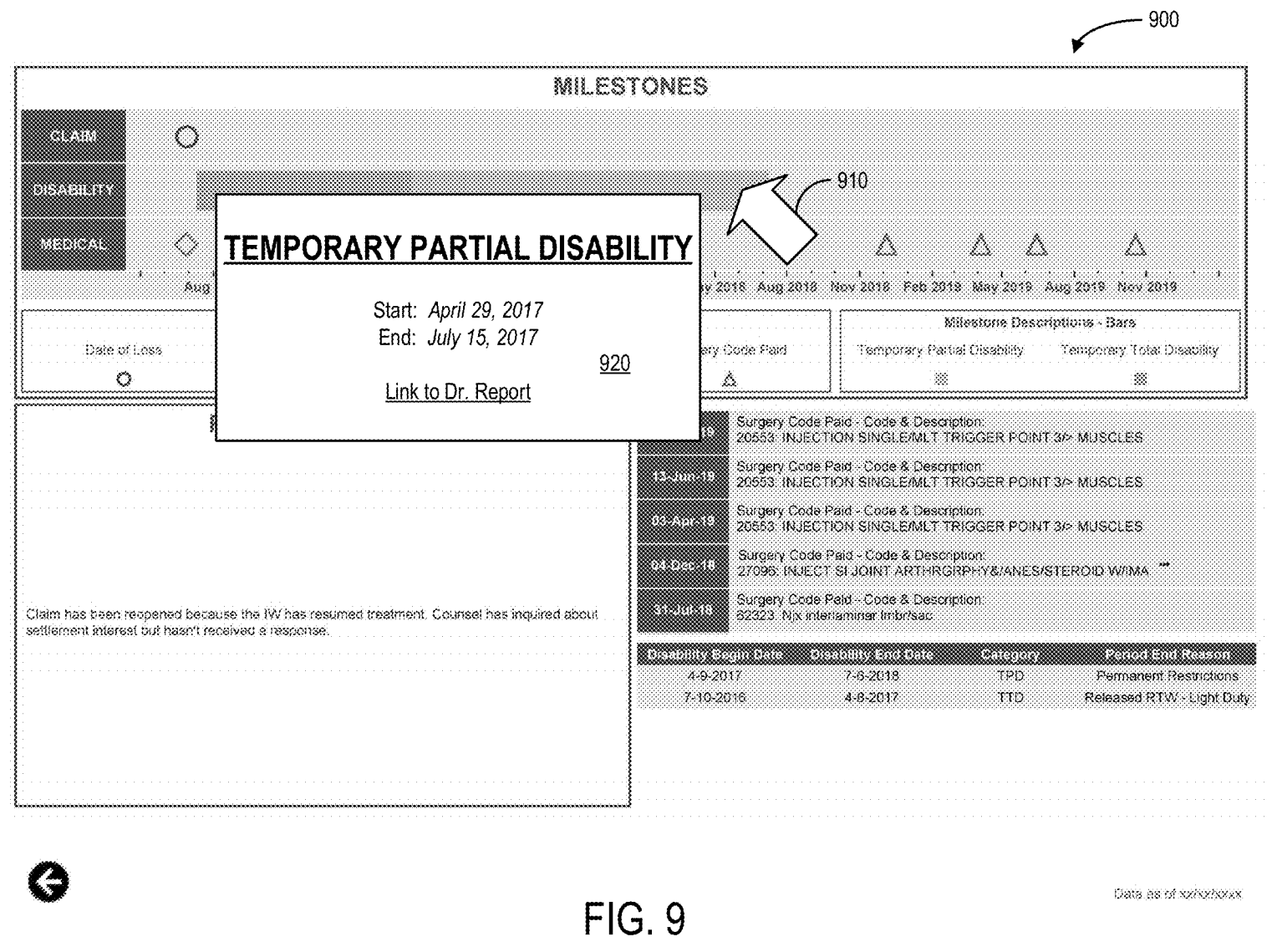

FIG. 9 illustrates an "interactive" claim review display 900 according to some embodiments. In this case, selection or "roll-over" of a graphical element of the display 900 (e.g., via a computer mouse pointer 910 or touchscreen) results in the display of a popup window 920 that shows additional details about that element. According to some embodiments, such a popup window 920 might be utilized to adjust or alter information (e.g., a user might enter a new "End Date" via the popup window 920).

Figure 10:
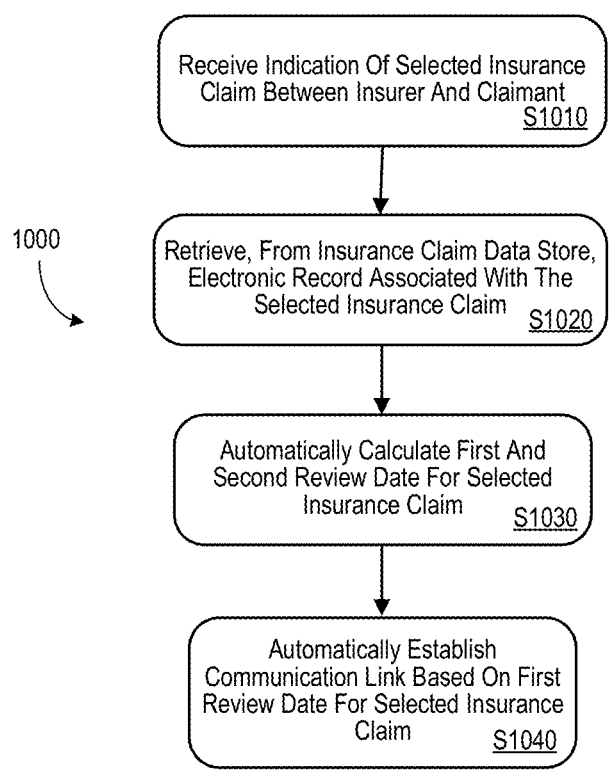
FIG. 10 illustrates a method according to some embodiments of the present invention.

FIG. 10 illustrates a method 1000 according to some embodiments of the present invention. At S1010, a back-end application computer server (e.g., associated with an insurer) may receive an indication of an insurance claim between the insurer and a claimant. For example, a claim handler might select an insurance claim from a list of pending insurance claims. At S1020, the back-end application computer server may retrieve, from an insurance claim data store, an electronic record associated with the selected insurance claim, including a claim identifier, date of injury, type of injury, communication address, etc.

At S1030, the system may automatically calculate a first and second review date for the selected insurance claim. The first review date might, for example, indicate when a team internal to an insurance enterprise will review the selected insurance claim. The second review date might, according to some embodiments, indicate when the insurance enterprise will use claim review displays to explain an insurance claim situation to an insurance agent, broker, and/or customer.

At S1040, the system may automatically establish a communication link based on the first review date for the selected insurance claim. This link might be used, for example, to internally (within an insurer) review and/or discuss claim information with a claim handler, claim account executive, workforce manager, team leader, etc. Note that the back-end application computer server may support a graphical interactive user interface display via a distributed communication network, and the interactive user interface display may provide insurance claim data (external to the insurer) in connection with the second review date. According to some embodiments, the calculation of the first and/or second review dates may be associated with a predictive model created using data fields and text flags identified in electronic records of an insurance claim data store, claim data, bill data from a bill review system, etc.

Figure 11:
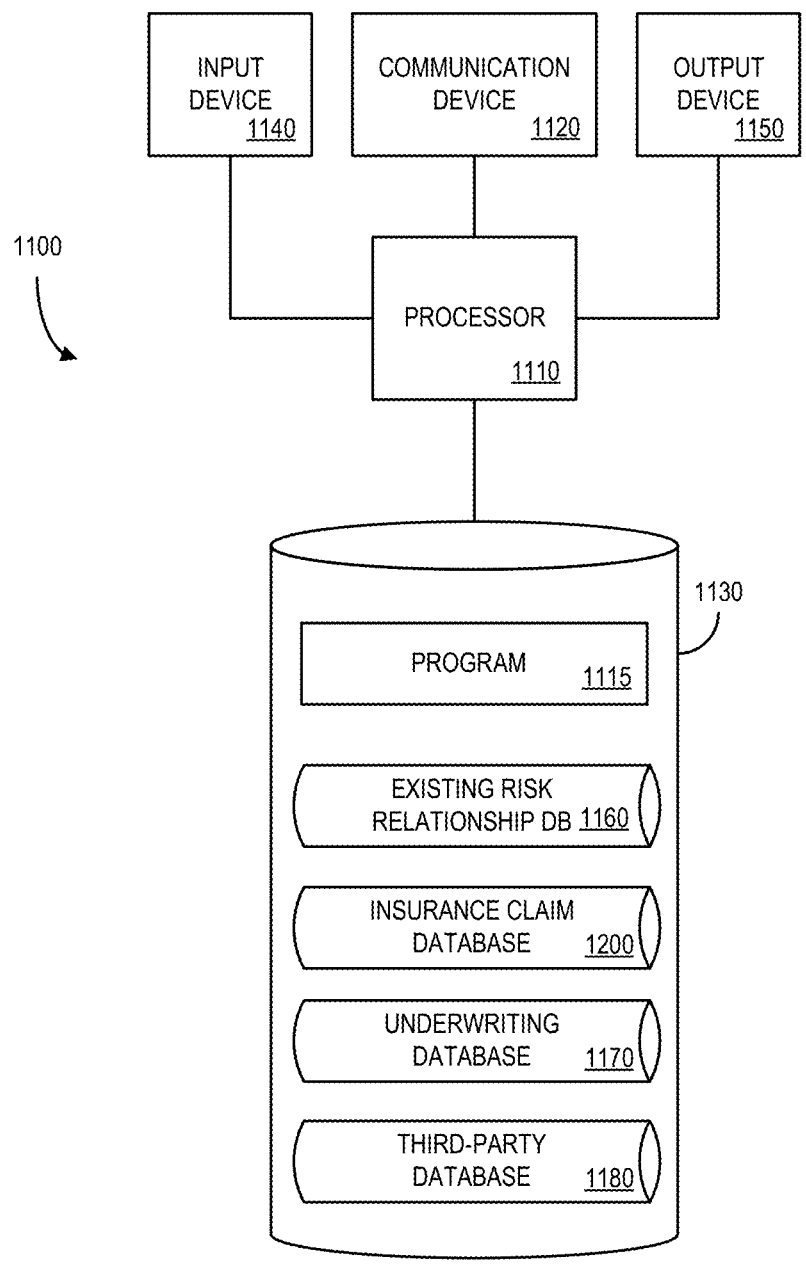
FIG. 11 is a block diagram of an apparatus in accordance with some embodiments of the present invention.

The embodiments described herein may be implemented using any number of different hardware configurations. For example, FIG. 11 illustrates an apparatus 1100 that may be, for example, associated with the systems 300, 600 described with respect to FIGS. 3 and 6, respectively. The apparatus 1100 comprises a processor 1110, such as one or more commercially available Central Processing Units ("CPUs") in the form of one-chip microprocessors, coupled to a communication device 1120 configured to communicate via communication network (not shown in FIG. 11). The communication device 1120 may be used to communicate, for example, with one or more remote administrator computers and or communication devices (e.g., PCs and smartphones).

Note that communications exchanged via the communication device 1120 may utilize security features, such as those between a public internet user and an internal network of the insurance enterprise. The security features might be associated with, for example, web servers, firewalls, and/or PCI infrastructure. The apparatus 1100 further includes an input device 1140 (e.g., a mouse and/or keyboard to enter information about an insured, injuries, claim negotiations, etc.) and an output device 1150 (e.g., to output review displays regarding insurance claim status).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a resource allocation tool or application for controlling the processor 1110. The processor 1110 performs instructions of the program 1115, and thereby operates in accordance with any of the embodiments described herein. For example, the processor 1110 may provide an automated data driven risk relationship review tool. A resource allocation data store may contain electronic records representing requested resource allocations between the enterprise and a plurality of entities. The processor 1110 may receive an indication of a selected requested resource allocation and retrieve, from the resource allocation data store, the electronic record associated with the selected requested resource allocation. The processor 1110 may automatically calculate a first and second review date for the selected requested resource allocation and automatically establish a communication link based on the first review date for the selected requested resource allocation. The processor 1110 may then support a graphical interactive user interface display via a distributed communication network, the interactive user interface display providing resource allocation data in connection with the second review date.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the back-end application computer server 1100 from another device; or (ii) a software application or module within the back-end application computer server 1100 from another software application, module, or any other source.

In some embodiments (such as shown in FIG. 11), the storage device 1130 further stores an existing risk relationship database 1160 (e.g., containing insurance policy information), an insurance claim database 1200, an underwriting database 1170, and a third-party database 1180. An example of a database that might be used in connection with the apparatus 1100 will now be described in detail with respect to FIG. 12. Note that the database described herein is only an example, and additional and/or different information may be stored therein. Moreover, various databases might be split or combined in accordance with any of the embodiments described herein. For example, the existing risk relationship database 1160 and the insurance claim database 1200 might be combined and/or linked to each other within the program 1115.

Figure 12:
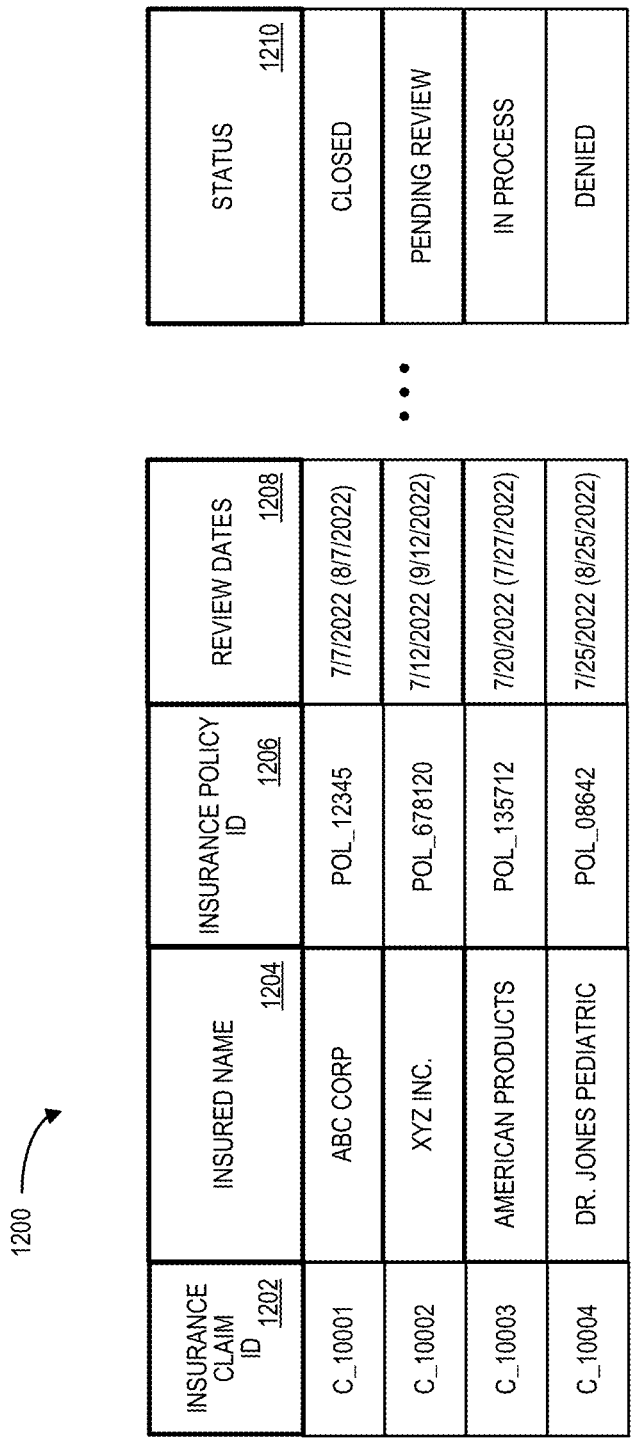
FIG. 12 is a portion of a tabular resource allocation database according to some embodiments.

Referring to FIG. 12, a table is shown that represents the insurance claim database 1200 that may be stored at the apparatus 1200 according to some embodiments. The table may include, for example, entries associated with insurance claims that have been submitted by claimants. The table may also define fields 1202, 1204, 1206, 1208, 1210 for each of the entries. The fields 1202, 1204, 1206, 1208, 1210 may, according to some embodiments, specify: an insurance claim identifier 1202, an insured name 1204, an insurance policy identifier 1206, review dates 1208, and a status 1210. The insurance claim database 1200 may be created and updated, for example, based on information electrically received from various operators, administrators, and computer systems, including those associated with an insurer.

The insurance claim identifier 1202 may be, for example, a unique alphanumeric code identifying a request for resources (e.g., when an employee working for an insured becomes injured while at work). The insured name 1204 might be associated with the owner of insurance policy associated with the identifier 1206. The review dates 1208 might be automatically calculated by the system and be associated with an internal insurer claim review, an external explanation about the claim, an automatically established communication link, etc. Note that the database 1200 will include additional information about each insurance claim (not illustrated in FIG. 12), such as claim handler notes, medical treatment costs, legal negotiations, etc. The status 1210 might indicate that the insurance claim is closed, pending review, in process, denied, etc.

Thus, embodiments may be associated with an automated and efficient way to display a data driven risk relationship review tool in a way that provides more accurate results, which are easier to communicate in a timely fashion as compared to traditional approaches. Embodiments may aggregate data from multiple sources and use machine learning algorithms to help claim handlers quickly recognize which claims might need closer attention. By digesting information, such as medical records, and applying artificial intelligence, embodiments may leverage available data and automate medical treatment judgements, help motivate and influence claimant behavior, etc. The displays may provide a "360" degree view of a claim or customer including aggregated data from many different sources. For example, a claim handler might quickly understand two years of complex claim processing with such an end-to-end view of the data. Note that the data used to render the displays described herein might include data from unstructured sources, such as paragraphs of text from manually created notes, governmental or medical documents, phone call transcripts, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in addition to and/or instead of the policies described herein (e.g., professional liability insurance policies, extreme weather insurance policies, etc.). Similarly, although certain attributes (e.g., values analyzed in connection with resource allocation requests) were described in connection some embodiments herein, other types of attributes might be used instead.

Figure 13:
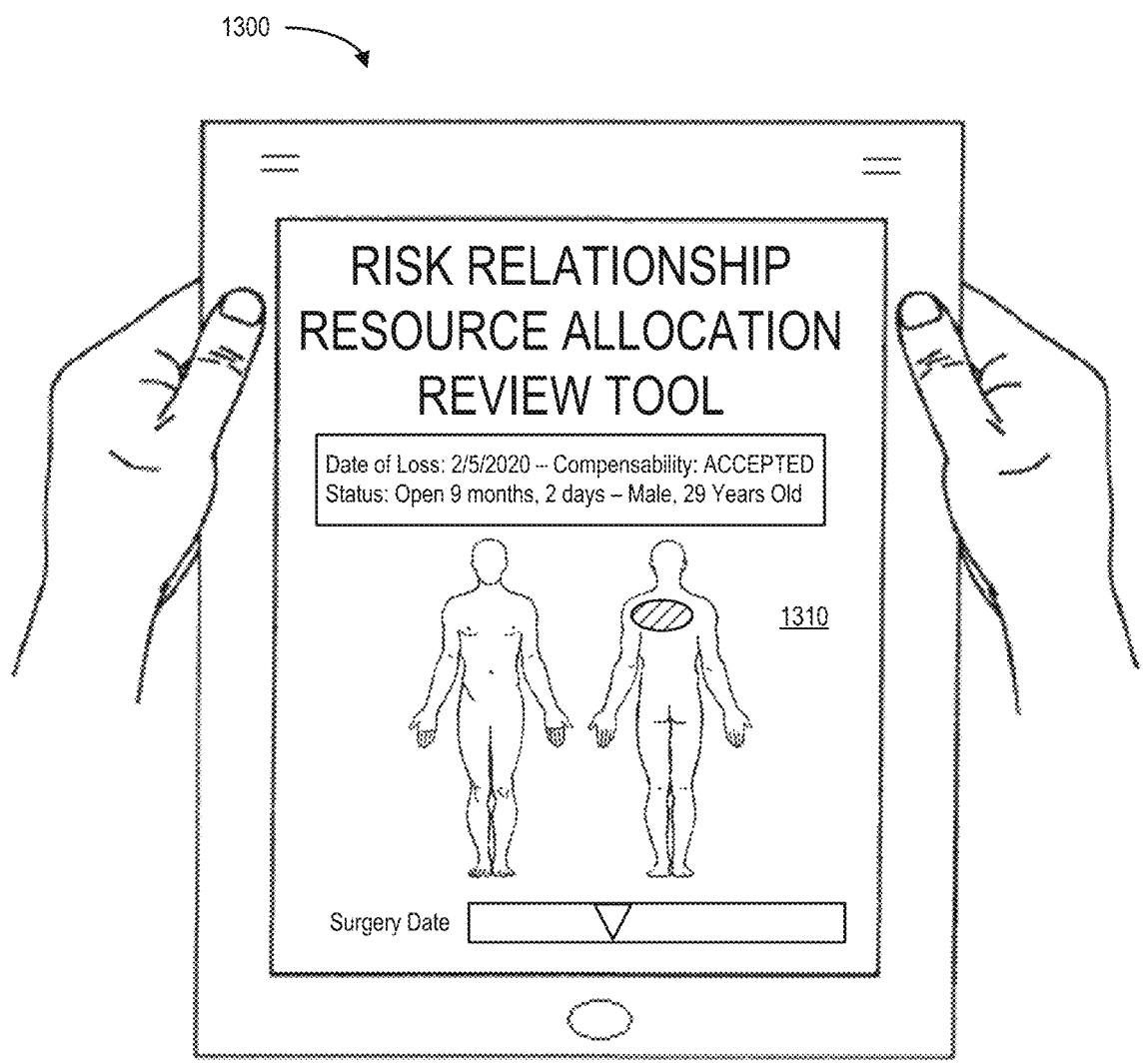
FIG. 13 illustrates a tablet computer displaying a data driven risk relationship review tool user interface according to some embodiments.

Further, the displays and devices illustrated herein are only provided as examples, and embodiments may be associated with any other types of user interfaces. For example, FIG. 13 illustrates a handheld tablet computer 1300 showing a data driven risk relationship review tool display 1310 according to some embodiments. The resource allocation tool display 1310 might include user-selectable data that can be selected and/or modified by a user of the handheld computer 1310 to provide insurance claim review information to insurance agents/brokers and/or customers.

Note that the displays described herein might be constantly updated based on new information (e.g., as data is received by the insurer). For example, the displays might be updated in substantially real time or on a periodic basis (e.g., once each night). According to some embodiments, a claim handler might be able to select a particular time in the past and the displays may be updated to reflect the information as it previously existed at that particular time (e.g., what would the claim handler have seen one year ago?).

Figure 14:
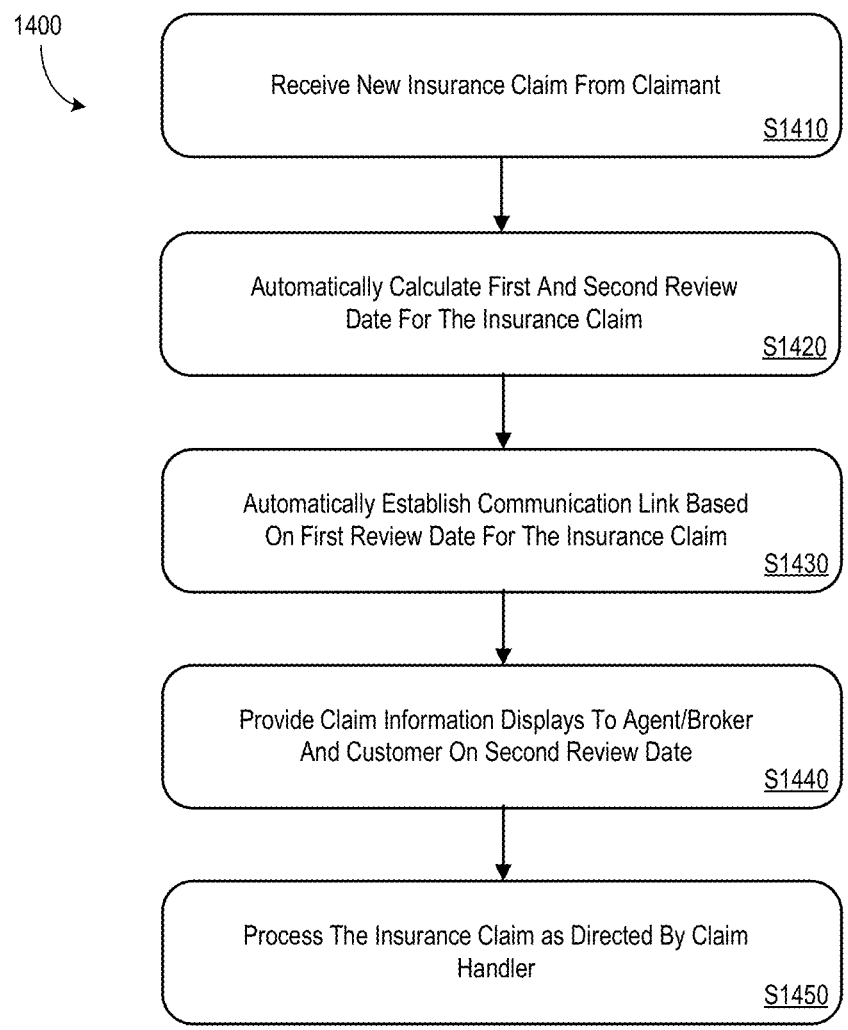
FIG. 14 illustrates an overall process in accordance with some embodiments.

FIG. 14 illustrates an overall business process 1400 in accordance with some embodiments. At S1410, an insurer may receive a new insurance claim from a claimant. This information may be collected from various sources, including medical records, an incident report, etc. At S1420, the system may automatically calculate a first and second review date for the insurance claim. The first review date might, for example, indicate when a team internal to an insurance enterprise will review the insurance claim. The second review date might, according to some embodiments, indicate when the insurance enterprise will use claim review displays to explain an insurance claim situation to an insurance agent, broker, and/or customer.

At S1430, the system may automatically establish a communication link based on the first review date for the insurance claim. This link might be used, for example, to internally (within an insurer) review and/or discuss claim information with a claim handler, claim account executive, workforce manager, team leader, etc. At S1440, claim information displays are provided to an insurance agent/broker and/or customer as part of a review process (e.g., as described in connection with FIGS. 7A through 8B) on the second review date. The insurer may then process the insurance claim as directed by the claim handler, agent/broker, and/or customer (e.g., by approving medical procedures or otherwise recommending a medical treatment, implementing a return-to-work strategy, etc.) at S1450.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to provide a data driven risk relationship review tool via a back-end application computer server of an enterprise, comprising:
    (a) a plurality of remote devices;
    (b) an email server, workflow application, and calendar application to automatically schedule meetings and establish communication links;

(c) a resource allocation data store containing electronic records that represent a plurality of requested resource allocations between the enterprise and a plurality of entities, wherein each electronic record includes an electronic record identifier and a set of resource allocation values associated with risk attributes;

(d) the back-end application computer server, coupled to the plurality of remote devices, the email server, workflow application, calendar application, and resource allocation data store, including:
  a computer processor, and
  a computer memory, coupled to the computer processor, storing instructions that, when executed by the computer processor, cause the back-end application computer server to:
  (i) receive, from a first remote device of the plurality of remote devices, an indication of a selected requested resource allocation between the enterprise and an entity,
  (ii) retrieve, from the resource allocation data store, the electronic record associated with the selected requested resource allocation, including the set of resource allocation values associated with risk attributes,
  (iii) automatically calculate a first and second review date for the selected requested resource allocation, and
  (iv) automatically establish a communication link as one of an audio link, a text chat link, and a video link and schedule a meeting for the first review date, via the email server, workflow application, and calendar application, based on the calculation of the first review date for the selected requested resource allocation, wherein the communication link is established between at least two parties; and (e) a communication port coupled to the back-end application computer server to transmit data to the first remote device to support a graphical interactive user interface display via a distributed communication network, the interactive user interface display providing resource allocation data in connection with the second review date.

2. The system of claim 1, wherein calculation of the first and second review dates are associated with at least one of: a predictive model created using data fields and text flags identified in electronic records of the resource allocation data store, claim data, and bill data from a bill review system.

3. The system of claim 1, wherein the communication link is further associated with at least one of: (i) a calendar application, and (ii) an email message.

4. The system of claim 1, wherein the user interface further provides a view of claim factors that draw attention to the request if there is a potential of increasing severity.

5. The system of claim 1, wherein the user interface further provides at least one of: (i) demographic information, (ii) graphical indications of body locations, (iii) resource allocation reserve information, (iv) a resource allocation reserve rationale, (v) time information, and (vi) a resource allocation resolution plan.

6. The system of claim 1, wherein the user interface leverages insights from multiple machine learning assets and claim metrics.

7. The system of claim 1, wherein risks of certain aspects of a claim are calculated by the system and used to provide a next best action to a claim handler.

8. A computerized method to provide a data driven risk relationship review tool via a back-end application computer server of an enterprise, comprising:
  receiving information by a computer processor of the back-end application computer server from a bill data source and a third-party data source;
  receiving, by the computer processor of the back-end application computer server from a first remote device of a plurality of remote devices, an indication of a selected requested resource allocation between the enterprise and an entity;
  retrieving, from a resource allocation data store, an electronic record associated with the selected requested resource allocation, including a set of resource allocation values associated with risk attributes, wherein the resource allocation data store contains electronic records that represent a plurality of requested resource allocations between the enterprise and a plurality of entities, and further wherein each electronic record includes an electronic record identifier and a set of resource allocation values associated with risk attributes;
  automatically calculating a first and second review date for the selected requested resource allocation; and
  automatically establishing a communication link as one of an audio link, a text chat link, and a video link and schedule a meeting for the first review date, via an email server, workflow application, and calendar application, based on the calculation of the first review data for the selected requested resource allocation, wherein the communication link is established between at least two parties and wherein the back-end application computer server transmits data, including the aggregated information, to the first remote device in support of a graphical interactive user interface display via a distributed communication network, the interactive user interface display providing resource allocation data in connection with the second review date.

9. The method of claim 8, wherein calculation of the first and second review dates are associated with at least one of: a predictive model created using data fields and text flags identified in electronic records of the resource allocation data store, claim data, and bill data from a bill review system.

10. The method of claim 8, wherein the communication link is further associated with at least one of: (i) a calendar application, and (ii) an email message, (iii) an audio link.

11. The method of claim 8, wherein the user interface further provides a view of claim factors that draw attention to the request if there is a potential of increasing severity.

12. The method of claim 8, wherein the user interface further provides at least one of: (i) demographic information, (ii) graphical indications of body locations, (iii) resource allocation reserve information, (iv) a resource allocation reserve rationale, (v) time information, and (vi) a resource allocation resolution plan.

13. The method of claim 8, wherein the user interface leverages insights from multiple machine learning assets and claim metrics.

14. The method of claim 8, wherein risks of certain aspects of a claim are calculated by the system and used to provide a next best action to a claim handler.

15. A non-transitory, computer-readable medium storing instructions, that, when executed by a processor, cause the processor to perform a method to provide a data driven risk relationship review tool via a back-end application computer server of an enterprise, the method comprising:

receiving information by a computer processor of the back-end application computer server from a bill data source and a third-party data source;

receiving, by the computer processor of the back-end application computer server from a first remote device of a plurality of remote devices, an indication of a selected requested resource allocation between the enterprise and an entity;

retrieving, from a resource allocation data store, an electronic record associated with the selected requested resource allocation, including a set of resource allocation values associated with risk attributes, wherein the resource allocation data store contains electronic records that represent a plurality of requested resource allocations between the enterprise and a plurality of entities, and further wherein each electronic record includes an electronic record identifier and a set of resource allocation values associated with risk attributes;

automatically calculating a first and second review date for the selected requested resource allocation; and automatically establishing a communication link as one of an audio link, a text chat link, and a video link and scheduling a meeting for the first review date, via an email server, workflow application, and calendar application, based on the calculation of the first review date for the selected requested resource allocation, wherein the communication link is established between at least two parties, and wherein the back-end application computer server transmits data to the first remote device in support of a graphical interactive user interface display via a distributed communication network, the interactive user interface display providing resource allocation data in connection with the second review date.

16. The medium of claim 15, wherein calculation of the first and second review dates are associated with at least one of: a predictive model created using data fields and text flags identified in electronic records of the resource allocation data store, claim data, and bill data from a bill review system.

17. The medium of claim 15, wherein the communication link is further associated with at least one of: (i) a calendar application, and (ii) an email message.

18. The method of claim 15, wherein the user interface further provides a view of claim factors that draw attention to the request if there is a potential of increasing severity.

19. The medium of claim 15, wherein the user interface further provides at least one of: (i) demographic information, (ii) graphical indications of body locations, (iii) resource allocation reserve information, (iv) a resource allocation reserve rationale, (v) time information, and (vi) a resource allocation resolution plan.

20. The medium of claim 15, wherein the user interface leverages insights from multiple machine learning assets and claim metrics.

21. The medium of claim 15, wherein risks of certain aspects of a claim are calculated by the system and used to provide a next best action to a claim handler.

* * * * *